United States Patent [19]
McAninch et al.

[11] 3,815,443
[45] June 11, 1974

[54] DIFFERENTIAL MECHANISM

[75] Inventors: Herbert A. McAninch, Auburn; Spencer H. Mieras, Fort Wayne, both of Ind.

[73] Assignee: Borg Warner Corporation, Chicago, Ill.

[22] Filed: Jan. 14, 1963

[21] Appl. No.: 262,814

Related U.S. Application Data

[62] Division of Ser. No. 769,682, Oct. 27, 1958.

[52] U.S. Cl. ................................................. 74/711
[51] Int. Cl. ............................................. F16h 1/44
[58] Field of Search ........................... 74/711, 710.5

[56] References Cited
UNITED STATES PATENTS
2,778,246  1/1957  Thornton ............................. 74/711
2,923,174  2/1960  Gleasman ............................ 74/711
3,027,781  4/1962  O'Brien .............................. 74/711
3,051,020  8/1962  Hartupee .......................... 74/710.5

*Primary Examiner*—Arthur T. McKeon
*Attorney, Agent, or Firm*—C. G. Stallings; Lyle S. Motley

[57] ABSTRACT

A differential mechanism having frusto-conical members wherein there are recesses within the side gears and the frusto-conical members containing spring means causing the frusto-conical members to engage the carrier casing.

4 Claims, 8 Drawing Figures

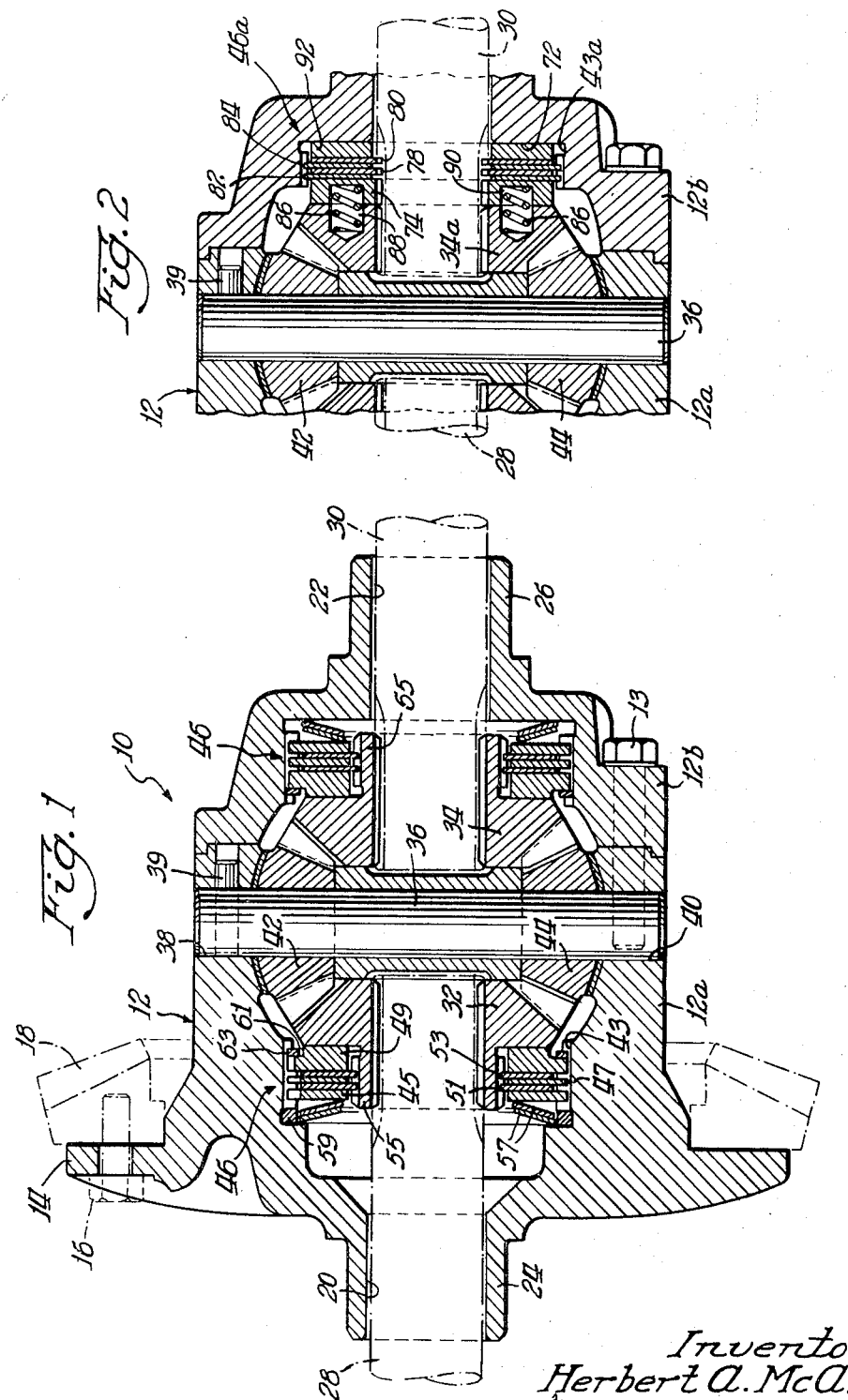

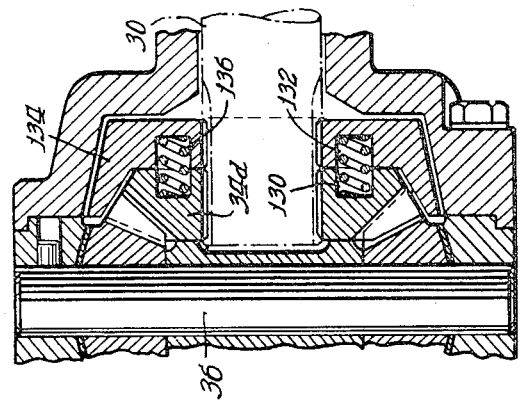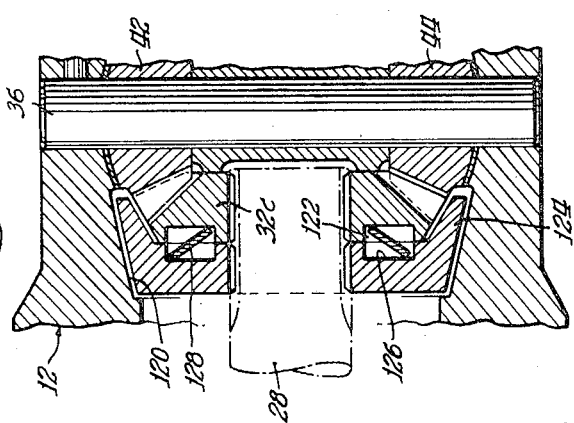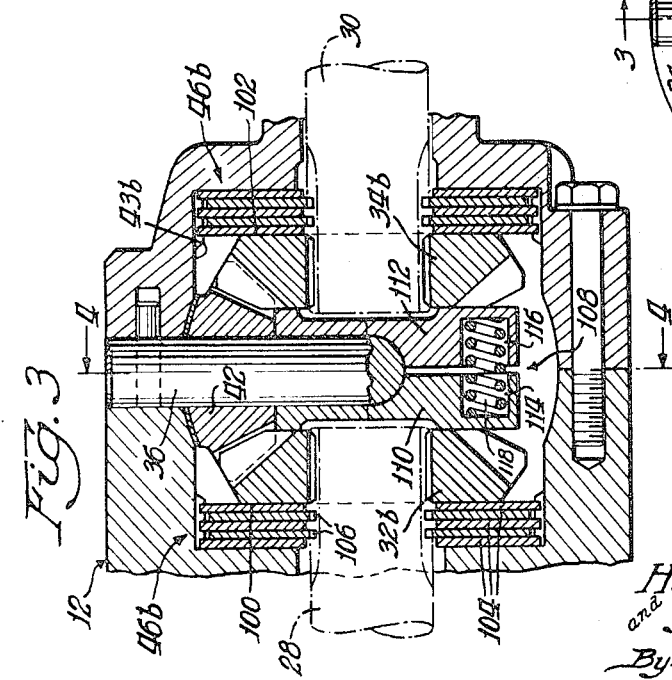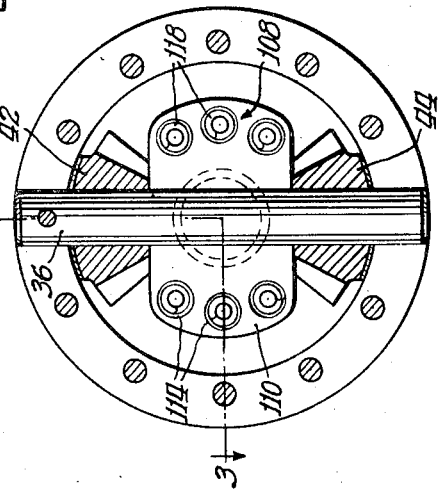

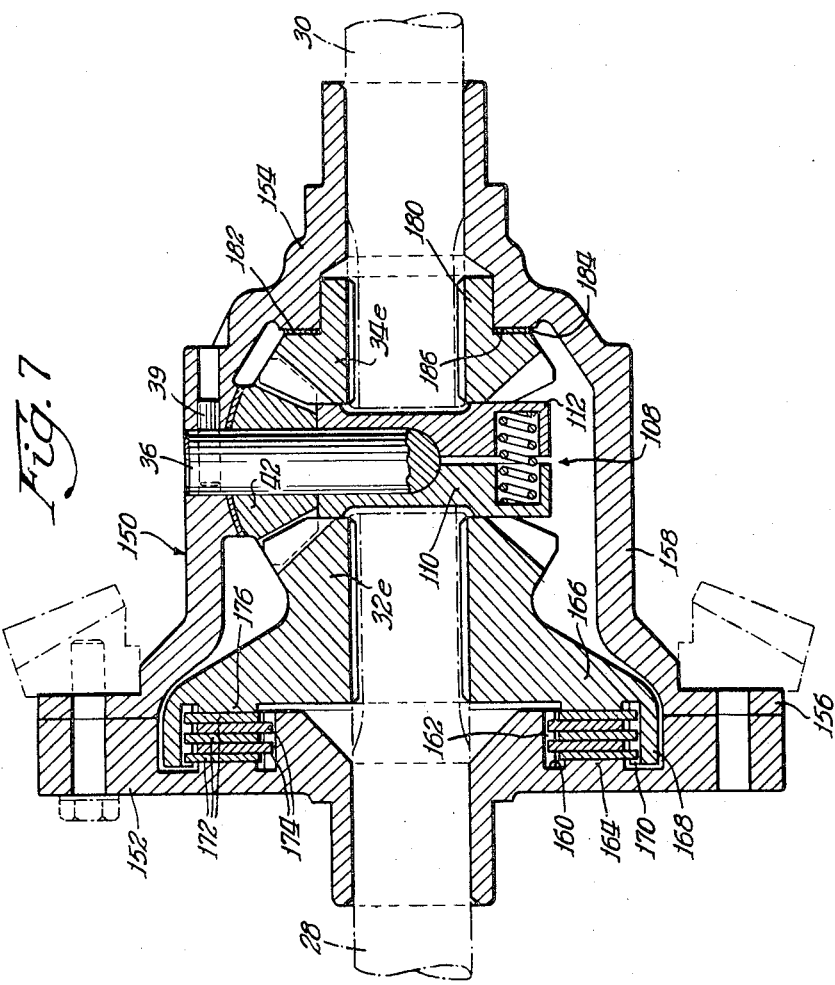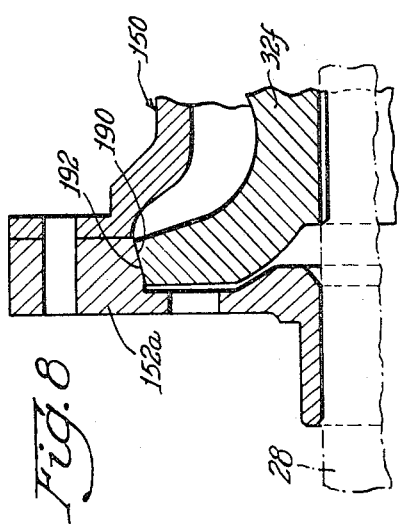

DIFFERENTIAL MECHANISM

The present application is a division of Ser. No. 769,682 which was filed Oct. 27, 1958.

This invention relates to differential mechanisms and more particularly to a differential mechanism in which differentiation is retarded.

This invention is primarily directed to a differential mechanism in which the resistance to differentiation is afforded by dual means including gear reaction and a spring preload.

A primary object of the invention is to provide a differential mechanism in which differentiation is resisted by dual means including novel means for clutching the differentiating element to the differential casing.

A more particular object of the invention is to provide a differential mechanism having a casing, output shaft mounted for rotation in the casing, side gears affixed to the inner ends of the output shafts, pinion gears in mesh with the side gears and normally adapted to revolve as the side gears rotate and adapted further to rotate with respect to the side gears when differentiation is required, a disc pack forming a clutch for each of the side gears, each of the disc packs being actuated by spring means exerting a constant force biasing the side gears into frictional engagement with the casing and being actuated further by gear reaction proportional to the torque transmitted.

Another object of the invention is to provide a differential mechanism of the type described in which a constant biasing is exerted on a disc pack to afford a uniform resistance to differentiation and in which the constant biasing is exerted by spring means comprising a plurality of circumferentially spaced coil springs received in registering pockets in the side gears and an annulus in axial alignment with the discs of each pack.

A further object of the invention is to provide a differential mechanism of the type characterized by resistance to differentiation in which the differential casing is hollow in construction and is provided with a substantially frusto-conical surface spaced outwardly from the inner ends of the output shafts, in which a brake drum having a correspondingly formed periphery is mounted between each of the side gears and the casing, and in which an annular spring of the Belleville type is interposed between each of the side gears and its associated brake drum to exert a constant resistive bias.

Another object of the invention is to provide a differential mechanism of the type characterized by resistance to differentiation in which the differential casing is hollow in construction and is provided with a substantially frusto-concial surface spaced outwardly from the inner ends of the output shafts, in which a clutch drum having a correspondingly formed periphery is mounted between each of the side gears and the casing, and in which the outer periphery of the clutch drums are urged into frictional engagement with the frusto-conical surfaces of the casing by means of a plurality of circumferentially spaced coil springs received in registering pockets in the side gear and the adjacent clutch drum.

An additional object of the invention is to provide a differential mechanism of the type above set forth in which one of the side gears is grounded to the differential casing at points spaced radially outwardly from the zone of mesh of the pinion gears and the side gears.

This invention consists of the novel constructions, arrangements, and devices to be hereinafter described and claimed for carrying out the above stated objects and such other objects as will be apparent from the following description of preferred forms of the invention, illustrated with reference to the accompanying drawings, wherein:

FIG. 1 is a vertical elevational view of a differential mechanism made in accordance with the present invention;

FIG. 2 is a fragmentary vertical sectional view of the modified form of the invention;

FIG. 3 is a fragmentary elevational sectional view of a further modified form of the invention taken substantially on line 3—3 of FIG. 4;

FIG. 4 is an elevational view, partly in section, taken substantially on line 4—4 of FIG. 3;

FIG. 5 is a fragmentary elevational sectional view of a differential mechanism constructed in accordance with the principles of the present invention;

FIG. 6 is a fragmentary vertical sectional view of a modified form of the invention;

FIG. 7 is a vertical sectional view of another modified form of the present invention; and FIG. 8 is a fragmentary sectional view of still another modified form of the present invention.

Referring now to the drawings and more particularly to FIG. 1, the preferred form of differential mechanism of the present invention is indicated generally by reference numeral 10 and includes a differential casing 12 having an integrally formed radial flange 14 to which is secured by means of circumferentially spaced cap screws 16 a ring gear 18 (shown in dot-and-dash lines) connectible to the engine drive shaft in conventional fashion by a pinion gear (not shown). The casing 12 is shown as comprising complementary sections 12a and 12b secured each to the other by circumferentially spaced cap screws 13, is hollow in construction and is provided with diametrically opposed openings 20 and 22 defined by hubs 24 and 26 respectively. Journalled in the hubs 24 and 26 are output shafts 28 and 30 respectively. Splined to the inner ends of the shafts 28 and 30 for limited axial movement with respect thereto are side gears 32 and 34 respectively. A shaft 36 extends through the hollow interior of the casing 12 and is affixed at each end in diametrically opposed openings 38 and 40 by means of pins 39 (only one of which is shown). Rotatably mounted on the shaft 36 are pinion gears 42 and 44 each of which is in constant mesh with the side gears 32 and 34.

Power is normally transmitted from the engine drive shaft to the output shafts 28 and 30 by rotating the casing 12 and revolving the pinion gears 42 and 44 for rotation of the side gears 32 and 34 at equal speed. When differentiation is required relative movement occurs between the pinion gears 42 and 44 and one of the side gears 32 and 34 so that the pinion gears assume a new position with respect to that side gear and equal speed to the output shafts may be affected as before.

According to the present invention, relative movement of one of the gears 32 or 34 with respect to the pinion gears 42 and 44 is resisted under all conditions tending to effect differentiation. As will be hereafter apparent, this resistance to differentiation is effected by a dual means including a constant force operative under all torque conditions and a second force which varies according to the torque input at the time differentiation occurs. The casing section 12a is provided adjacent the opening 20 with a splined bore 43. Slidably received in the bore 43 is a disc pack 46 including an annulus 45, of steel or the like, having a splined outer periphery received in the splines of the bore 43. Also slidably received in the bore 43 is an annular disc 47, of steel or the like, and a relatively thick annular retainer block 49, of sintered iron or the like. Both the discs 47 and the block 49 have splined outer peripheries received in the splines of the bore 43, interleaved between the disc 47 and the elements 45 and 49 are annular discs 51 and 53, desirably of bronze or the like. The discs 51 and 53 are splined at their inner peripheries for sliding reception on an externally splined hub 55 integrally formed with the side gear 32. The elements 51 and 53 are normally held in frictional engagement with the elements 45, 47 and 49 by means of a pair of annular springs 57 of the Belleville type. While two annular springs are illustrated, it will be understood that one of such springs will suffice. The outer peripheries of the springs 57 abut against a snap ring 59 received in a suitable groove at the inner end of the bore 43, while the inner edges of the springs abut against one side of the annulus 45. By this arrangement, the discs 51 and 53 are maintained in frictional engagement with the elements 45, 47 and 49 and, in addition, the right side of the block 49, as viewed in FIG. 1, is urged into frictional engagement with the left side of the side gear 32. The block 49 has an annular recess 61 in which is received a snap ring 63 which resides in a correspondingly formed groove in the bore 43 to retain the elements 45, 47, 49, 51 and 53 in assembled relation.

It will be appreciated that the springs 57 exert a constant resistive bias on the side gear 32 and the output shaft 28 so that differentiation is retarded. Differentiation is also resisted by the tooth pressure of the pinion gears 42 and 44 against the side gears 32 and 34. Since the tooth pressure varies in accordance with the torque input to the differential unit, the resistance to differentiation increases in proportion to torque input and thus the total resistance to differentiation is cumulative.

The casing section 12b is provided with a disc pack 46 identical to that employed in the casing section 12a. In this instance, the side gear 34 is provided with an integral hub section 65 externally splined in the same manner as the hub 55 of the side gear 32. Each disc pack operates in the same fashion, as will be understood.

Referring now to FIG. 2, there is illustrated in this figure a modified form of the invention. Certain of the elements of this modified form of the invention are identical to that of the form of the invention of FIG. 1 and like reference numerals are employed. The casing 12 has complementary sections 12a and 12b which are apertured for apertured shafts 28 and 30 respectively. Pinion gears 42 and 44 are mounted for rotation on a shaft 36 secured to the casing by pins 39. In this instance, however, a disc pack 46a is utilized in lieu of the disc pack 46 and a side gear 34a cooperates with the disc pack 46a in a novel manner which will now be described. The casing section 12b includes a bore 43a subjoining an annular flat surface 72. The disc pack 46a includes a relatively thick annulus 74 having a splined inner periphery receivable on the same splines of the shaft 30 as the side gear 34a. Also splined to the shaft 30 are discs 78 and 80, preferably of bronze or the like. Interleaved with the discs 78 and 80 are discs 82 and 84 having splined outer peripheries received in the splines of the bore 43a. The disc pack 46a is provided with a constant frictional bias by means of a plurality of circumferentially spaced coil springs 86 received in a corresponding number of pockets 88 in one face of the side gear 34a and registering pockets 90 in the confronting face of the annulus 74. It will be apparent that the annulus 74 urges the several discs into engagement and biases the disc 80 against an annulus 92 which is in frictional engagement with the annular surface 72 of the casing section 12b. As in the principle form of the invention, a constant resistive bias is afforded by springs and a varying bias is afforded by the tooth pressure which varies with the torque input. It will be understood that the other side of the casing 12 is identical to the side illustrated.

Referring now to FIG. 3, there is illustrated in that figure a further modified form of the invention having certain elements identical to that of the form of the invention illustrated in FIG. 1 and identified by identical reference numerals. The casing 12, in this instance, has a bore 43b in which is positioned a disc pack 46b. The pinion gears 42 and 44 are the same as in FIGS. 1 and 2. In this instance, however, side gears 32b and 34b are splined to output shafts 28 and 30 respectively. The side gears 32b and 34b are respectively provided with flat annular outer surfaces 100 and 102 which abut against the associated disc packs 46b. Each of the disc packs 46b includes spaced discs 104 having splined outer peripheries received in the splines of the bore 43b and interleaved discs 106 whose inner peripheries are splined to the shafts 28 and 30 respectively.

The side gears 32b and 34b are biased uniformly outwardly by a spring assembly 108 which comprises housing sections 110 and 112 mounted in surrounding relation to the shaft 36 for limited relative movement each to the other. The section 110 is provided with a plurality of pockets 114 while the section 112 is provided with a similar number of registering pockets 116. In the registering pockets is received a spring 118. By this arrangement, the sections 110 and 112 are urged outwardly, thus urging the side gears 32b and 34b into engagement with the associated disc pack 46b.

Referring now to the drawings and particularly to FIG. 5, the differential mechanism of the present invention includes a casing 12 which is formed with a substantially frusto-conical surface 120 spaced radially outwardly from the zone of engagement of the pinion gears 42 and 44 with side gears 32c and 34c (not shown). The left side of the side gear 32c, as viewed in that figure, is provided with an annular groove 122. A clutch drum 124 is splined to the shaft 28 and has a corresponding groove 126 in register with the groove 122. Positioned in the collaborating 122 and 126 is an annular spring 128 of the Belleville type. The spring 128 exerts a constant bias urging the clutch drum 124 into engagement with the frusto-conical surface 120. As in the other forms of the invention this bias is supplemented by the force exerted by tooth pressure which, as pointed out previously, is proportional to the torque input.

In FIG. 6 is shown another modified form of the present invention similar to FIG. 5 but having, in lieu of the grooves 122 and 126 a side gear 34d having a plurality of circumferentially spaced pockets 130 in register with similarly formed pockets 132 in a clutch drum 134. In each pair of registering pockets is a helical spring 136.

The drum 134 has a substantially frusto-conical outer periphery which is urged into engagement with a correspondingly formed surface of the casing by the springs 136. It will thus be seen that the springs 136, in this form of the invention, exert the constant resistive bias. This bias is supplemented by the variable torque bias, as in the other forms of the invention.

In FIG. 7 is illustrated another modified form of the invention having a differential casing 150 which comprises a first section 152 and an elongated second section 154 having at one end a radially outwardly extending flange 156 and an adjacent flared portion 158. The flange 156 is secured to the section 152 by suitable fastening means as in the other forms of the invention. The shaft 36 extends through the casing section 154 and carries pinion gears 42 and 44. Only the pinion gear 42 is illustrated since this view is similar to FIG. 3. The shaft 36 is retained in position by circumferentially spaced pins 39 as in the other forms of the invention. In this form of the invention, however, a side gear 32e is splined to the output shaft 28 and a side gear 34e is splined to the output shaft 30.

The casing section 152, in this instance, is provided with an annular groove 160 having splines 162 at its inner periphery and an annular flat ridge 164 at its base, for a purpose hereafter described. The side gear 32e has an radially extending section 166 having an axially extending flange 168 at its outer periphery. The flange 168 has internal splines 170. Receivable in the splines 170 are correspondingly splined annular clutch discs 172. Interleaved with the clutch discs 172 are similarly formed clutch discs 174 splined at their outer periphery to the splines 162 of the casing section 152. An annular ridge 176 is formed in the section 166 of the side gear 32e in register with the ridge 164 of the casing section 152. It will be noted that the side gear 34e has a reduced portion 180 defining a shoulder 182.

The side gears 32e and 34e are biased uniformly outwardly by the spring assembly 108, as in FIG. 3. As the side gear 32e moves outwardly, the discs 172 are urged into engagement with the discs 174 and differentiation is resisted.

Upon outward movement of the side gear 34e the shoulder 182 is urged into frictional engagement with an annular ring 184 of friction material which is in abutment with an annular surface 186 formed in the housing section 154 in the zone of mesh of the pinion gears and the side gears.

In FIG. 8 is shown a modified form of the invention illustrated in FIG. 7 in which casing section 152a is recessed and provided with a frusto-conical surface 190. A side gear 32f is flared outwardly at one end and has a frusto-conical surface 192 which is urged into frictional engagement with the frusto-conical surface 190 by the spring assembly 108 and the gear reaction, as in the other forms of the invention. It will be noted that the surfaces 190 and 192 engage at points spaced radially outwardly from the zone of mesh of the pinion gears and side gears, as in the form of the invention shown in FIG. 7.

The differential mechanism of the above described invention exhibits important advantages over resistive differential mechanisms of the types heretofore known. For instance, the grounding of the side gears is effected in areas located either in the zone of mesh of the pinion or side gears, as in the forms of the invention shown in FIGS. 7 and 8 or in areas outside the zone of mesh. The constant resistive bias utilized in the present invention may take the form of any elastic member, it being understood that the spring arrangements are merely illustrative.

While we have described our invention in connection with certain specific constructions and arrangements, it is to be understood that this is by way of illustration and not by way of limitation and the scope of our invention is defined solely by the appended claims which should be construed as broadly as the prior art will permit.

We claim:

1. In a differential mechanism the combination comprising a hollow casing adapted to be rotated, a plurality of pinion gears rotatably and revolvably mounted in said casing, said casing having means defining a pair of openings, an output shaft received in each of said openings, a side gear affixed on the inner end of each of said shafts for limited axial movement with respect thereto, each of said gears being in mesh with said pinions and normally driven thereby at equal speed, said gears being normally relatively fixed with respect to said pinions and being relatively movable with respect thereto to afford differentiation, said casing having a pair of frusto-conical surfaces interiorly thereof adjacent each of said openings and spaced radially outwardly from the zone of meshing of said pinion gears and said side gears, a clutch drum interposed between each of said side gears and the adjacent opening, each of said drums having a peripheral frusto-conical surface adapted to engage an adjacent frusto-conical surface of said casing and spring means for exerting a constant resistive bias on said side gears, spring means including a Belleville washer received in registering annular recesses in each of said clutch drums and said side gears.

2. In a differential mechanism the combination comprising a hollow casing adapted to be rotated, a plurality of pinion gears rotatably and revolvably mounted in said casing, said casing having means defining a pair of openings, an output shaft received in each of said openings, a side gear affixed on the inner end of each of said shafts for limited axial movement with respect thereto, each of said gears being in mesh with said pinions and normally driven thereby at equal speed, said gears being normally relatively fixed with respect to said pinions and being relatively movable with respect thereto to afford differentiation, said casing having a pair of frusto-conical surfaces interiorly thereof adjacent each of said openings and spaced radially outwardly from the zone of meshing of said pinion gears and said side gears, a clutch drum interposed between each of said side gears and the adjacent opening, each of said drums having a peripheral frusto-conical surface adapted to engage an adjacent frusto-conical surface of said casing and spring means for exerting a constant resistive bias on said side gears, said spring means including a plurality of circumferentially spaced coil springs received in registering pockets in each of said clutch drums and said side gears.

3. In a differential mechanism, the combination comprising a gear case having oppositely disposed frusto-conical surfaces formed therein; differential side gears mounted in said casing; compensating pinion gears carried by said gear case and located between said side gears and in meshing relationship therewith; clutch means rotatable with said side gears including a conical friction surface adapted to engage the respective frusto-conical surfaces in said casing to retard differentiation, said side gears and said clutch means being mounted for axially shiftable movement with respect to said casing; and resilient means interposed between said side gears and said clutch means to urge the conical friction surfaces on said clutch means into engagement with the frusto-conical surfaces on said casing, said side gears and said compensating pinion gears having positive pressure tooth characteristics so that an increase in torque input results in limited axial shifting of said side gears against said resilient means and clutch means to effect further engagement of said clutch means with said casing.

4. The apparatus as defined in claim 3 wherein said side gears and said clutch means include recesses facing each other to provide a pocket for the reception of said resilient means.

* * * * *